May 2, 1961 C. M. BROWNE 2,982,934

ELECTRICALLY CONDUCTING GLASS UNIT

Filed Aug. 27, 1956

INVENTOR.
Charles M. Browne

BY

Nobbe & Swope
ATTORNEYS 2,982,934
Patented May 2, 1961

2,982,934

ELECTRICALLY CONDUCTING GLASS UNIT

Charles M. Browne, Toledo, Ohio, assignor to Libbey-Owens-Ford Glass Company, Toledo, Ohio, a corporation of Ohio Filed Aug. 27, 1956, Ser. No. 606,307
3 Claims. (Cl. 338—323)

The present invention relates broadly to electrically conducting sheets, and more particularly to special electrodes for use with transparent electrically conducting films on transparent sheet material.

It is now known that transparent sheet material may be provided with electrically conducting films, and such films have various uses such as in de-icing windshields or windows for aircraft or as dissipators for static electricity. These films may be composed of electrically conducting metal oxides such as tin oxide or thin transparent films of conducting metal such as gold, and they have been provided on transparent sheets of various materials such as glass and methyl methacrylate plastic.

In its broad aspect, the electrode structure of this invention may be used with any of the filmed sheet materials described above. However, this invention is particularly useful in providing an improved electrode for electrically conducting glass sheets in which the electrically conducting film on the glass is tin oxide. The electrode structure also is particularly valuable when the filmed sheet is to serve as an integral part of a laminated unit, and the invention will be described in detail in its specific form in connection with laminated electrically conducting safety glass units.

Briefly stated, this invention is based on my discovery that an electrode in the form of a tape may be used in combination with electrically conducting films by causing the tape to adhere to the film by means of an adhesive material having a finely divided conducting material incorporated therein. In the preferred form of this invention, the tape is of a metal such as copper and usually in a thickness of 1 to 2 thousandths of an inch. It is also contemplated that plastic tapes may be used but, in any event, the tape has a pressure sensitive type adhesive applied to one surface with the essential characteristic of this adhesive being that it is electrically conducting.

Therefore a primary object of the present invention is to provide an electrically conducting unit having a novel and improved electrode structure.

Another object of this invention is to provide an electrode structure in an electrically conducting unit of the above described type in which the interfacial resistance between the electrode and the film is substantially eliminated.

A further object of this invention is to provide a laminated electrically conducting transparent unit having an improved electrode structure which provides for simpler fabrication of the laminated unit.

Other objects and advantages of the invention will become more apparent during the course of the following description, when taken in connection with the accompanying drawings.

In the drawings, wherein like numerals are employed to designate like parts throughout the same:

Figures 1, 2:
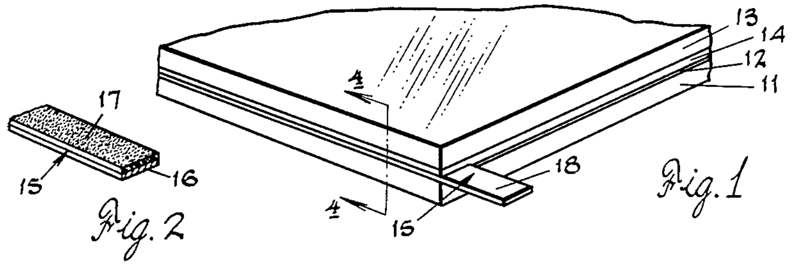
Fig. 1 is a fragmentary perspective view illustrating an article embodying this invention.
Fig. 2 is a perspective view illustrating an electrode tape of this invention.

In Fig. 1, there is shown a typical form of article produced in accordance with this invention, and in which a transparent sheet of glass 11 provided with an electrically conducting film 12 is laminated with a transparent sheet of glass 13 by means of a plastic interlayer 14. Permanently secured to the film 12 is an electrode 15 which is laminated between the sheets 11 and 13.

The electrode 15, which is illustrated in Fig. 2, preferably comprises a copper strip 16 having an electrically conducting pressure sensitive adhesive 17 on one of its flat surfaces.

A typical adhesive may be made by milling 10 grams of a silicone such as Dow Corning 994 and 10 grams of a finely divided metal such as Du Pont Flake V-9 silver with a sufficient quantity of a solvent such as toluene to form a spraying mixture. After milling for several hours to insure good distribution, the mixture is sprayed onto strips of tape. The tape is then dried, preferably under infrared light which rapidly volatilizes the solvent leaving the pressure sensitive adhesive on the tape.

Figure 3:
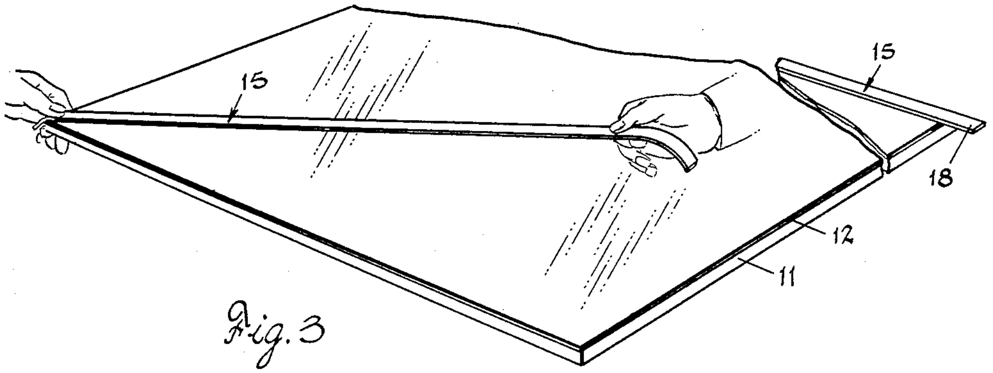
Fig. 3 is a perspective view illustrating the application of the electrode tape of this invention to a transparent electrically conducting unit.
Figure 4:
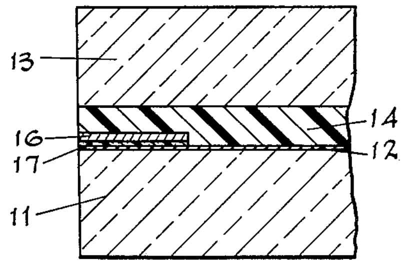
Fig. 4 is a fragmentary cross-sectional view taken along the line 4—4 of Fig. 1 illustrating a preferred form of this invention embodied in a laminated safety glass unit.

The electrode may be applied as illustrated in Fig. 3 by placing the tape over the electrically conducting film 12 so that the pressure sensitive adhesive is in contact therewith, and applying sufficient pressure to secure the tape on the surface. In order to provide a good bond between the tape and the film 12 and a permanent electrical contact therebetween, the adhesive is cured by heat and pressure, and if the unit is to be laminated the curing is preferably done during the laminating step. When an electrode 15 having a metal or copper strip 16 is used, the tape may be applied with an end 18 extending beyond the edge of the glass sheet 11 to provide for connection of lead wires.

After the tape has been applied, the sheet of plastic 14 and the second transparent sheet 13 are assembled and the unit is subjected to heat and pressure according to standard laminating procedure to form a composite unit. During the laminating step the electrically conducting adhesive is heat cured to provide a permanent bond between the copper strip and the electrically conducting film when adhesives are used which are cured by the laminating conditions. The silver powder and the adhesive provides a good permanent electric contact between the copper strip and electrically conducting film which has the advantage of substantially eliminating the interfacial resistance. Such a structure also provides an electrode which may be applied without a firing step such as is required for fired-on silver electrodes and also provides a unit which is easily handled during laminating.

When the unit is made with copper tape, and silicon adhesive and heat tested to destruction, plastic bubbling or cracking of the glass occurs before the electrode is destroyed. Cold testing of such units constructed without a parting material in a cold room at —65° F. in which the sheets were alternately heated and cooled by on-off application of electricity was done without any breakdown occurring, which demonstrated that effective bonding of the electrode was achieved.

Figure 5:
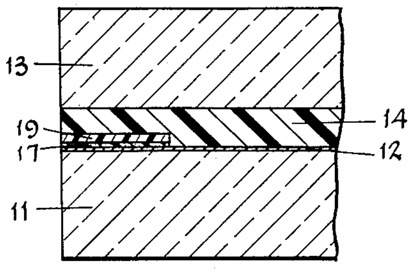
Fig. 5 is a fragmentary cross-sectional view similar to Fig. 4, but illustrating a modified form of this invention.

While, as already explained, the preferred electrode is a copper tape having an electrically conducting adhesive on a surface, it is also contemplated that plastic tape may be used as an electrode in certain situations. Such an electrode could be any plastic material which may be formed into a flexible tape such as DuPont Mylar plastic, and the electrically conducting adhesive layer is formed thereon in the same fashion as illustrated hereinbefore with the copper tape 16. Such a tape may be applied as was the copper tape and laminated to form the unit illustrated in Fig. 5, in which a sheet 11 having an electrically conducting film 12 is provided with the plastic tape 19 and adhered thereto by means of the electrically conducting adhesive 17, and the unit laminated with the sheet 13 by means of the plastic interlayer 14 to provide a unit such as that illustrated in Fig. 5. Since the electrode does not have such a low resistance as the copper tape employed in the preferred embodiment, it is not suitable where high power is required over the electrically conducting film, but may be used where low power is required such as in a static eliminator.

Figure 7:
Fig. 7 is a cross-sectional view illustrating still another form of this invention.

As another embodiment of this invention, plastic tape may contain a metal filler material and the preferred metal filled plastic tape has at least two layers which differ in their concentration of metal filler as shown in Fig. 7. For example, the plastic tape may be prepared by filling Mylar plastic with powdered silver in a concentration of two parts of silver to one part of Mylar plastic to form the layer 21. Such a plastic affords relatively good electrical conductance but comparatively poor adhesion. A second layer 22 of plastic tape is prepared which has a concentration of one part powdered silver and one part resin and cured in adjacent position to the above mentioned plastic tape. This last layer provides greater adhesion and strength and still sufficient conductance to allow electricity to flow therethrough. The resulting tape may then have the electrically conducting adhesive layer 17 of this invention formed over a surface thereof and applied as was the plastic tape without metal filling. While this tape does not provide as much conductance as the copper tape, it provides sufficient conductivity for most uses with electrically conducting films.

Figure 6:
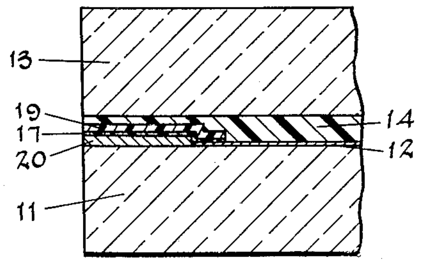
Fig. 6 is a fragmentary cross-sectional view illustrating another form of this invention.

The plastic tape type electrode of this invention may also be used to eliminate interfacial resistance between fired-on silver electrodes and electrically conducting film. Such a structure is illustrated in Fig. 6 in which the glass sheet 11 is provided with a conventional fired-on metal-flux electrode 20 adjacent to the electrically conducting film 12. The plastic tape 19 having the electrically conducting adhesive layer 17 is applied over both the electrode 20 and the electrically conducting film 12 and bridges the meeting line therebetween. In this arrangement the plastic tape not only serves to eliminate interfacial resistance, but the plastic also serves as a parting material for laminating. A strong bond to the electrode by the laminating plastic is not desirable because a strong bond will cause stripping of the electrode from the glass when the unit is subjected to low temperatures such as —50° F. However, when a parting material is used the unit may be subjected to these low temperatures without destroying the bond with the fired-on silver. It is also contemplated that any other flexible material such as canvas, or glass cloth may be used in place of the plastic tape in the practice of this invention.

In several small scale tests, strips of Du Pont Mylar plastic were coated with a silicone-silver pressure sensitive adhesive mixture. When applied over electrodes, having an initial electrode-film interface of 97 ohms, the interface resistance dropped to zero. Also Mylar film seemed to have weak adherence to the laminating plastic and serves well as a parting material.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. In an electrically conducting unit including an electrically conducting film on a sheet, an electrode in contact with the electrically conducting film, said electrode comprising a first layer of plastic having a powdered metal incorporated therein, a second layer of plastic havinf a powdered metal incorporated therein in a concentration different from that in said first layer, said first and second metal filled plastic layers being cured together to form a tape, and an adhesive material disposed on a surface thereof, said adhesive material comprising an adhesive resin and a powdered metal admixed therein.

2. A method of making an electrically conducting structure comprising filming a first sheet material with an electrically conducting film, admixing a pressure sensitive adhesive material and a powdered metal to prepare an electrically conducting adhesive, applying the adhesive to a copper tape, pressing the tape on the electrically conducting film with the adhesive in contact therewith, placing a thin strip of plastic material adherent to copper over the copper tape, placing a sheet of laminating plastic adjacent the electrically conducting film and the plastic on the copper tape, placing a second sheet material over the laminating plastic, and subjecting the unit to heat and pressure to form a composite article.

3. In an electrically conducting unit including an electrically conducting film on a sheet, an electrode in contact with the electrically conducting film, said electrode comprising a copper ribbon having a thickness of from 1 to 2 thousandths of an inch and having an adhesive thereon, said adhesive comprising a silicone and powdered metal admixed therewith.

References Cited in the file of this patent

UNITED STATES PATENTS

| | | |
|---|---|---|
| 2,498,493 | Hickernell | Feb. 21, 1950 |
| 2,559,077 | Johnson et al. | July 3, 1951 |
| 2,628,927 | Colbert et al. | Feb. 17, 1953 |
| 2,640,904 | Gaiser | June 2, 1953 |
| 2,679,569 | Hall | May 25, 1954 |
| 2,741,570 | Gaiser | Apr. 10, 1956 |
| 2,781,277 | Dwyer | Feb. 12, 1957 |
| 2,808,352 | Coleman et al. | Oct. 1, 1957 |
| 2,876,392 | Sanders | Mar. 3, 1959 |